United States Patent [19]

Rollason

[11] Patent Number: 5,029,260

[45] Date of Patent: Jul. 2, 1991

[54] KEYBOARD HAVING CONVEX CURVED SURFACE

[75] Inventor: Samuel H. Rollason, Baton Rouge, La.

[73] Assignee: The Board of Supervisors of Louisiana State University, Baton Rouge, La.

[21] Appl. No.: 496,525

[22] Filed: Mar. 19, 1990

[51] Int. Cl.[5] .................... G06C 7/02; G06C 25/00
[52] U.S. Cl. ............................................. 235/145 R
[58] Field of Search .................... 235/10, 145 R, 146; 364/708

[56] References Cited

U.S. PATENT DOCUMENTS 4,560,845  12/1985  Takamura et al. ............. 235/145 R
4,804,828   2/1989  Oogita ............................ 235/145 R Primary Examiner—Brian W. Brown
Attorney, Agent, or Firm—William David Kiesel; Robert C. Tucker

[57] ABSTRACT

A lap top keyboard is provided having an outwardly curved center for user comfort and efficiency. The lap support on an underside of the keyboard is recessed, allowing the keyboard to extend downward to an outside of the user's thighs.

7 Claims, 1 Drawing Sheet

KEYBOARD HAVING CONVEX CURVED SURFACE

BACKGROUND OF THE INVENTION

1. Field of the Invention

The invention relates generally to ergonomically designed keyboards for typewriters, personal computers, electronic musical keyboard instruments and the like. In particular, applicant's keyboard has keys arranged on a convex curve and has contoured padding underneath to comfortably rest the keyboard on a user's thighs, or to be placed on any other supportive surface, i.e. typing desk.

2. Prior Art

Persons whose job entails a significant portion of typing or data entry are prone to stress and repetitive task injuries to fingers, hands, wrists and shoulders. Adverse effects of repetitive tasks may range from mild discomfort, tendonitis and bursitis, leading to stiffness, and to carpal tunnel syndrome, caused by repetitive motion which may require surgical repair. In an effort to reduce injury to workers and increase efficiency, various designs have been proposed based on ergonomic considerations.

Vollbery, German Patent No. 552,611 discloses a keyboard with a left side and right side angled inward. There is a triangular section without keys between each of the sides. Further, each side of the keyboard forms a concave surface. In another prior art reference, Ryan, et al., International Patent Application WO 84/00518, the surface of the keyboard may be adjusted to suit a user. In Ryan, et al. the rows of keys are arranged on flexible bars. A compressive force may be applied to the ends of an individual bar to cause the bar to bow upward from the base of the keyboard. The distance that each row of keys is curved outward may be independently adjusted. A drawback of the aforementioned keyboard is that the underside of the keyboard necessarily houses the adjusting mechanism, thus limiting the ergonomic design possibilities for a lap top keyboard.

The layout of the individual keys on a keyboard may be modified to accommodate the length and range of motion of the user's fingers. Diernisse, U.S. Pat. No. 4,824,268 discloses a keyboard designed to take advantage of the irregular shape of a user's hands. The keyboard is arranged to match the characters most often used with the more dexterous digits of the hand. Adaptations of the Diernisse keyboard would require that those accustomed to the standard "QWERTY" keyboard be retrained.

Various apparatus are known in the prior art for supporting a console or desk on a person's lap or thighs. Examples of "lap top" supports may be found in the following patents:

U.S. Pat. No. 3,215,453 entitled "Flight Log and Approach Chart Presentation Apparatus" issued to R. Malcolm, Jr. on Nov. 2, 1965;

U.S. Pat. No. 4,052,944 entitled "Portable Shuffle Desk" issued to Russel A. Jennings on Oct. 11, 1977;

U.S. Pat. No. 4,518,164 entitled "Video Game Control Console" issued to Robert L. Hayford, Jr. on May 21, 1985; and U.S. Pat. No. 4,700,634 entitled "Lap-Oriented Portable Desk Units" issued to Arthur Mills, et al. on Oct. 20, 1987.

SUMMARY OF THE INVENTION

Therefore, an object of this invention is to provide an ergonomically designed keyboard to reduce physical stress and increase efficiency.

A further object of this invention is to provide an improved keyboard retaining the "QWERTY" keyboard layout.

Another object of the invention is to provide a keyboard which may be used in a lap top position.

Still another object of the invention is to provide a keyboard which curves outward toward the user and can be provided with recesses on an underside to conform to a user's thighs.

Accordingly, a keyboard is provided with the keys arranged on a surface which curves outward toward the user. The keyboard has a support underneath for resting the keyboard on the user's lap or thighs. The support is recessed to allow the keyboard to curve over the outside of the thighs. In a preferred embodiment, a level key pad is provided to the side of the outwardly curved portion.

DESCRIPTION OF THE PREFERRED EMBODIMENT

Without limiting the scope of the invention, the preferred features of the invention are hereinafter set forth.

Figure 1:
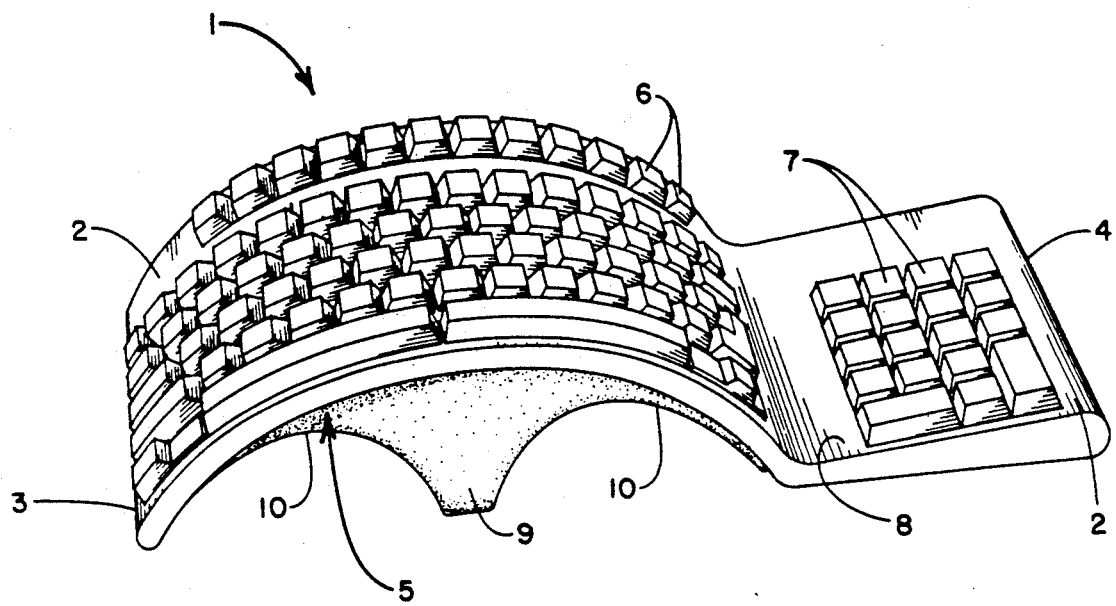
FIG. 1 is a perspective of the keyboard.

FIG. 1 is a perspective of keyboard 1 useful with a typewriter, personal computer, control console, electronic musical keyboard instruments or the like. Keyboard 1 has a base 2 with end 3 and end 4 located on the user's left and right respectively. Base 2 may be made of any suitable rigid or semirigid material such as polystyrene. Between ends 3 and 4 there is an upwardly curved center portion 5 which contains a set of keys 6. Keys 6 may represent a standard "QWERTY" keyboard or array of control buttons. The particulars of installing keys 6 in base 2 and the electronics which indicate when a key is stroked are well known to those with skill in the art and are not shown in detail.

Center portion 5 curves upward relative to ends 3 and 4. In the embodiment shown in FIG. 1, the rows of keys 6 curve uniformly from left to right and center portion 5 defines an arch. Or in other words, the columns of keys 6 are at a uniform height from front to back of center portion 5. A variation of the invention, encompassing a keyboard with an upwardly curved center portion 5, includes sloping the rows of key 6 upward from front to back as with a typewriter, by varying the radius of center portion 5 from front to back.

In a preferred embodiment, keyboard 1 is also provided with a second set of keys 7, such as numbers 0-9, function keys and cursor control keys. Keys 7 are positioned on flat portion 8 of base 2 between outwardly curved portion 5 and end 4. Alternatively, flat portion 8 could be positioned anywhere along base 2 between ends 3 and 4.

Figure 2:
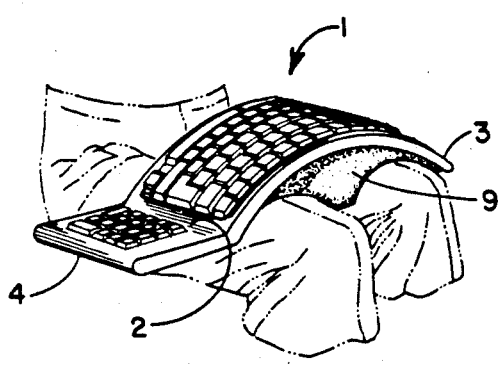
FIG. 2 is a perspective of the keyboard on the lap of a user.

Keyboard 1 is further provided with lap support 9 for supporting base 2 on the lap or thighs of a user as shown in FIG. 2. In one embodiment, lap support 9 has contoured leg rests 10 which run transverse to curved portion 5 across the width of base 2.

Figure 3:
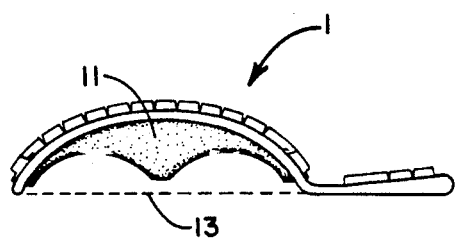
FIG. 3 is a cross section view of the keyboard with formed lap top support.
Figure 4:
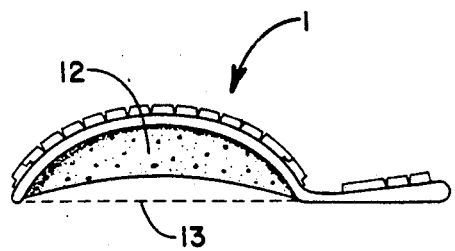
FIG. 4 is a cross section view of the keyboard with a sponge lap top support.

Lap support 9 may be made of a contoured, semirigid foam 11 as shown in FIG. 3. Alternatively, lap support 9 may be constructed from a soft deformable sponge rubber 12 as shown in FIG. 4, or fabric filled with beads. Lap support 9 may be contoured or be deformable to allow base 2 to wrap around the outer thigh of a user as shown in FIG. 2. The aforementioned fit may be accomplished by contouring foam 11 inward to a depth greater than an imaginary chord 13 shown drawn across curved portion 5 of base 2, which in this example is from end 3 to end 4. Likewise, keyboard 1 can be made to fit down over a user's legs by employing padding such as sponge rubber 12 which will deform towards center portion 5 of base 2 to a depth greater than chord 13.

There are, of course, many alternate embodiments and modifications which are intended to be included within the scope of the following claims.

What I claim is:

1. A keyboard comprising:
   (a) a base having first and second ends and a center portion curved upward between said ends to be positionable on a supporting structure during use of said keyboard;
   (b) a set of keys positioned on said upwardly curved center portion of said base to form an arch having a surface facing away from said supporting structure which is convex; and
   (c) a lap support connected to said base in a position to rest on said supporting structure during use of said keyboard, said lap support comprising first and second leg rests, inwardly curved relative to said base, said rests extending transverse to said outwardly curved portion of said base.

2. A keyboard according to claim 1 wherein said leg rests are curved inward towards said curved center portion of said base to a depth greater than a chord defined by said first and second ends of said base.

3. A keyboard comprising:
   (a) a base having first and second ends and a center portion curved upward between said ends to be positionable on a supporting structure during use of said keyboard;
   (b) a set of keys positioned on said upwardly curved center portion of said base to form an arch having a surface facing away from said supporting structure which is convex; and
   (c) a lap support connected to said base in a position to rest on said supporting structure during use of said keyboard, said lap support comprising a pad which is deformable inward towards said curved center portion of said base to a depth greater than a chord defined by said first and second ends of said base.

4. A keyboard according to claim 2 wherein said base further comprises a flat portion between said outwardly curved portion and one of said ends of said base, said flat portion being substantially co-planar with said ends, and a second set of keys positioned on said flat portion of said base.

5. A keyboard according to claim 3 wherein said base further comprises a flat portion between said outwardly curved portion and one of said ends of said base, said flat portion being substantially co-planar with said ends, and a second set of keys positioned on said flat portion of said base.

6. A keyboard according to claim 2 wherein said center portion defines an arch.

7. A keyboard according to claim 3 wherein said center portion defines an arch.

* * * * *